(12) United States Patent
Manthei

(10) Patent No.: US 6,955,015 B2
(45) Date of Patent: Oct. 18, 2005

(54) SYSTEM FOR INTERCONNECTING WALL BLOCKS

(75) Inventor: Benjamin R. Manthei, Petoskey, MI (US)

(73) Assignee: Redi-Rock International, LLC, Charlevoix, MI (US)

( * ) Notice: Subject to any disclaimer, the term of this patent is extended or adjusted under 35 U.S.C. 154(b) by 102 days.

(21) Appl. No.: 10/414,700

(22) Filed: Apr. 16, 2003

(65) Prior Publication Data

US 2003/0200716 A1 Oct. 30, 2003

Related U.S. Application Data

(60) Provisional application No. 60/376,359, filed on Apr. 29, 2002.

(51) Int. Cl.[7] .............................. E04B 1/38; E04B 2/02
(52) U.S. Cl. ........................ 52/223.7; 52/285.2; 52/295; 52/293.3; 52/379; 52/565; 52/583.1; 52/584.1; 52/607; 52/713; 52/587.1
(58) Field of Search ............................. 52/223.7, 293.3, 52/565, 568, 604, 605, 583.1, 251, 513, 587.1, 582.1, 295, 713, 584.1, 285.2, 378, 379, 747.12, 745.21; 405/286

(56) References Cited

U.S. PATENT DOCUMENTS

| | | | | |
|---|---|---|---|---|
| 365,427 A | * | 6/1887 | Berge | 52/584.1 |
| 1,050,130 A | * | 1/1913 | Harvey | 52/583.1 |
| 1,094,080 A | * | 4/1914 | Mayer | 52/193 |
| 1,194,305 A | * | 8/1916 | McMillan | 52/245 |
| 1,460,005 A | | 6/1923 | Wernicke | |
| 1,907,170 A | | 5/1933 | A'Hearn | |
| 1,959,816 A | | 5/1934 | Crum | |
| 2,071,069 A | * | 2/1937 | Heitman | 52/562 |
| 2,160,773 A | * | 5/1939 | Wolfe | 52/583.1 |
| 2,442,184 A | * | 5/1948 | Summers | 52/584.1 |
| 2,611,459 A | * | 9/1952 | Hammitt et al. | 52/713 |
| 2,627,176 A | * | 2/1953 | Levy | 52/223.7 |
| 3,325,956 A | | 6/1967 | Moraetes | |
| 4,227,829 A | | 10/1980 | Landry, Jr. | |
| 5,038,540 A | * | 8/1991 | Krautz | 52/245 |
| 5,048,250 A | | 9/1991 | Elias | |
| 5,433,053 A | * | 7/1995 | Tulloch | 52/582.1 |
| 5,797,234 A | | 8/1998 | Theodorou | |
| 6,508,607 B1 | | 1/2003 | Smith et al. | |
| 6,557,818 B2 | * | 5/2003 | Manthei | 249/171 |
| 6,564,524 B1 | * | 5/2003 | Gruita | 52/604 |
| 6,668,506 B2 | * | 12/2003 | Snauwaert | 52/583.1 |
| 6,715,965 B2 | * | 4/2004 | Manthei et al. | 405/284 |

FOREIGN PATENT DOCUMENTS

CH 606670 11/1978
CH 611372 5/1979

* cited by examiner

*Primary Examiner*—Robert Canfield
(74) *Attorney, Agent, or Firm*—MacMillan, Sobanski & Todd, LLC

(57) ABSTRACT

A wall is constructed from precast concrete blocks stacked in tiers in which adjacent blocks are secured together to increase the strength of the wall. Anchors are embedded in the tops of at least some of the blocks. The ends of the blocks have vertical grooves which form a vertical opening when the ends of two blocks abut. The blocks in the tiers are offset so that the openings between blocks in one tier are positioned above the anchors on the blocks on the adjacent lower tier. The blocks in each tier are secured together by a tensioned cable extending through aligned passages in the blocks. Locking members are placed in the openings to secure the ends of the abutting blocks to an anchor in an adjacent lower block.

15 Claims, 4 Drawing Sheets

SYSTEM FOR INTERCONNECTING WALL BLOCKS

CROSS REFERENCE TO RELATED APPLICATIONS

Applicant claims the benefit of U.S. Provisional Patent Application Ser. No. 60/376,359, filed on Apr. 29, 2002.

BACKGROUND OF THE INVENTION

Both retaining walls and freestanding walls are frequently constructed from concrete blocks. For increased stability, the blocks may be formed with interlocking knobs and grooves between blocks in adjacent tiers of blocks to prevent movement of the tiers of blocks.

A wall may be constructed around a building as a force containment wall, to reduce damage to the building from an explosion outside the wall. The containment wall also can prevent vehicles from entering a secure region around a building. For example, such a wall may be constructed, to prevent the possibility of a terrorist vehicle containing a bomb from approaching a government building. In this situation, the strength of the wall is important if the wall is to successfully prevent breach of the secure area by a determined vehicle driver.

Strong, one-piece walls may be formed from concrete poured in place and reinforced with steel rods. However, these walls are expensive and take longer to construct than a wall formed from precast blocks stacked into tiers. Additionally, poured concrete walls cannot be moved after they are constructed. On the other hand, a wall which is formed from stacked concrete blocks can be quickly constructed and later moved. However, such a wall may not provide the security of a one-piece wall and may be more easily breached by a vehicle or by an explosion.

BRIEF SUMMARY OF THE INVENTION

The invention is directed to a system for interconnecting concrete blocks which are stacked in tiers to form a freestanding wall or a retaining wall. The blocks are stacked in tiers with the abutting block ends in adjacent tiers offset. Ends of two adjacent blocks are connected together and also are connected to the block in the adjacent lower tier on which the ends of the two adjacent blocks rest. If desired, adjacent ends of blocks on the lowermost tier of blocks may be connected together and to a ground anchor to further stabilize the wall. To further strengthen the wall, a horizontal tube may be embedded in each concrete block to extend between the ends of the block. After blocks are stacked end to end to form a tier, a cable can be threaded through the tubes and tensioned.

Accordingly, it is an object of the invention to provide a system for strengthening walls formed from stacked concrete blocks.

DETAILED DESCRIPTION OF THE INVENTION

Figure 1:
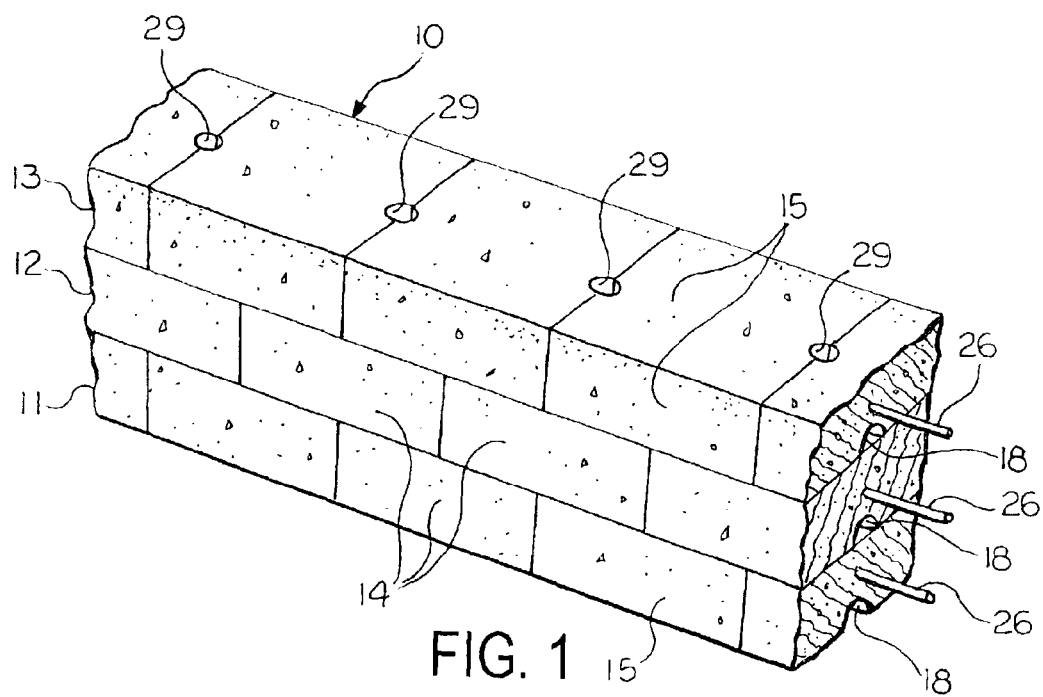
FIG. 1 is a fragmentary perspective view of a three tier freestanding wall constructed from concrete blocks connected together according to the invention.

In the following description of the invention, certain terminology will be used for the purpose of reference only, and are not intended to be limiting. Terms such as "upper" and "lower" refer to directions in the drawings to which reference is made. Terms such as "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Referring now to the drawings, FIG. 1 illustrates a section of an exemplary freestanding wall 10. The wall 10 includes three tiers 11–13. However, it will be appreciated that the wall 10 may be constructed with any number of tiers to provide a desired wall height. The tiers 11–13 are formed primarily of concrete blocks 14. While the illustrated blocks 14 are generally rectangular hexahedrons, it will be appreciated that the blocks 14 may be of any shape suitable for constructing the wall 10.

The exemplary wall 10 is constructed to function as a force containment wall. The wall 10 may also function as a decorative wall by providing optional texturing and coloring to exposed sides 15 of the blocks 14 to simulate a desired surface, for example, natural stone. The blocks 14 are formed with sufficient dimensions to provide desired strength to the wall 10. For example, the blocks 14 may be sized to have a weight in the range of between about 1,000 pounds and 3,000 pounds or more. A strong freestanding wall 10 according to the invention has been constructed from blocks 14 having a width of 46 inches (118 cm) a depth of 24 inches (61 cm) and a height of 18 inches (46 cm). However, it will be appreciated that the weight and dimensions of the blocks 14 may be varied, depending on the application and the desired wall strength and appearance.

Figure 2:
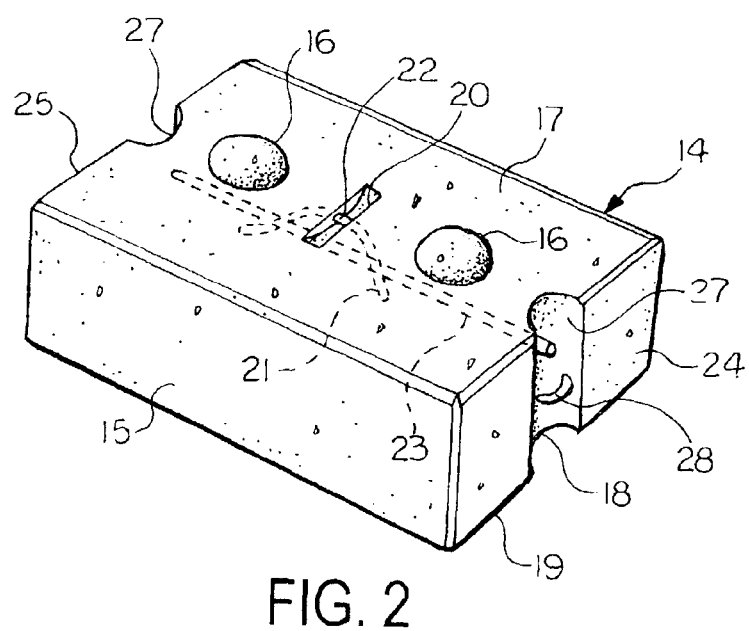
FIG. 2 is a perspective view of a concrete wall block of the wall of FIG. 1.
Figure 3:
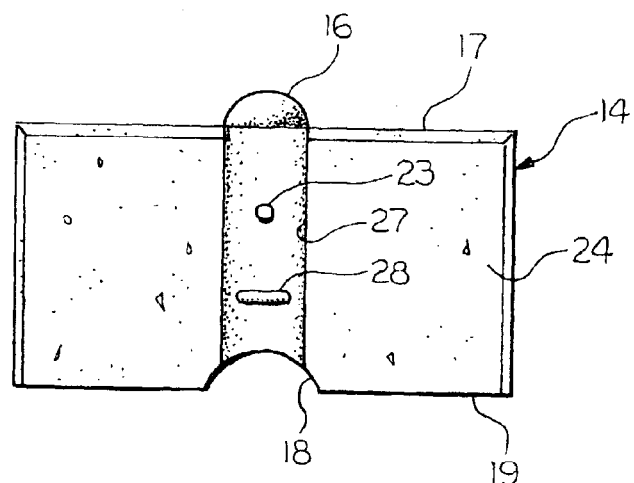
FIG. 3 is an end view of the concrete wall block of FIG. 2.

As shown in FIGS. 1–3, the blocks 14 may be designed with one or more knobs 16 (two illustrated) on a top surface 17. Optionally, as illustrated, the top knobs 16 may be omitted from the blocks 14 forming the uppermost tier 13. The blocks 14 may be designed and with a groove 18 in a bottom surface 19 to form an interlock between adjacent blocks in the tiers 11–13. Optionally, the bottom groove may 18 be omitted from the blocks 14 forming the lowermost tier 11 which sits on the ground. The blocks may be of a type shown, for example, in published U.S. patent application Ser. Nos. US2001/0026734A1 and US2001/0019684A1, the disclosures of which are incorporated herein.

A recess 20 is formed at the center of the top surface 17 of the blocks 14. A curved rod 21 is embedded in the block 14 to extend across the recess 21 to form an anchor 22. Optionally, as illustrated, the recess 20 and the curved rod 21 may be omitted from the blocks 14 forming the uppermost tier 13. When constructing the wall 10, a chain (not shown) may be attached to the anchor 22 for lifting and setting each block 14 in place. As is described below, the anchor 22 also is used to interconnect a block 14 in a lower tier 11 or 12 with ends of two adjacent blocks 14 in an adjacent upper tier 12 or 13.

According to one feature of the invention, a tube 23 is embedded in each block 14 to extend between opposite ends 24 and 25 of the block 14. When the blocks 14 are arranged end to end to form a tier of the wall 10, the tubes 23 are sufficiently aligned to permit passing a cable 26 (FIG. 1) through the tubes 23. The cable 26 is secured to blocks 14 forming the ends of the tier and the cable 26 is post tensioned to secure together the blocks 14 forming the tier.

Figure 4:
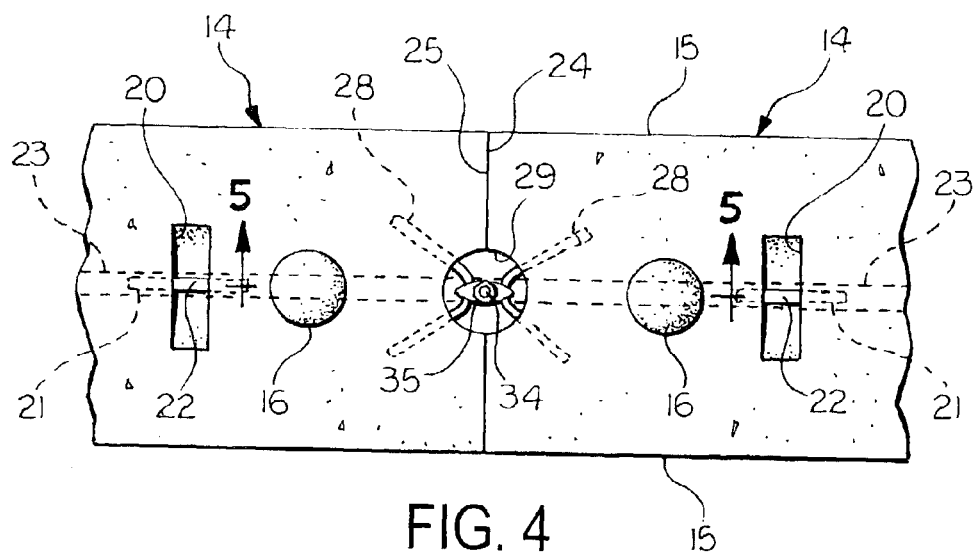
FIG. 4 is a fragmentary top plan view of two of the concrete blocks of FIG. 2 arranged end to end showing details of the connection between the bock ends.

As best seen in FIGS. 2–4, a semicircular vertical groove 27 is formed at the center of each end 24 and 25 of the blocks 14. A rod is embedded in the block 14 to form a hook 28 which extends across a portion of each groove 27. The hooks 28 and the anchor 22 may be formed, for example, from bent lengths of rebar, from other types of steel rods or cable, or from heavy duty eye bolts secured to a plate which is embedded in the block 14.

According to a further feature of the invention, the adjacent ends of two blocks 14, for example on the tier 12, are secured to each other and to an adjacent block 14 on an adjacent lower tier of blocks 14, for example of the tier 11. For the lowermost tier of blocks 11, the adjacent ends 24 and 25 of two blocks 14 may be secured to each other and to a ground anchor (not shown), or they may optionally not be secured to the ground.

Figure 5:
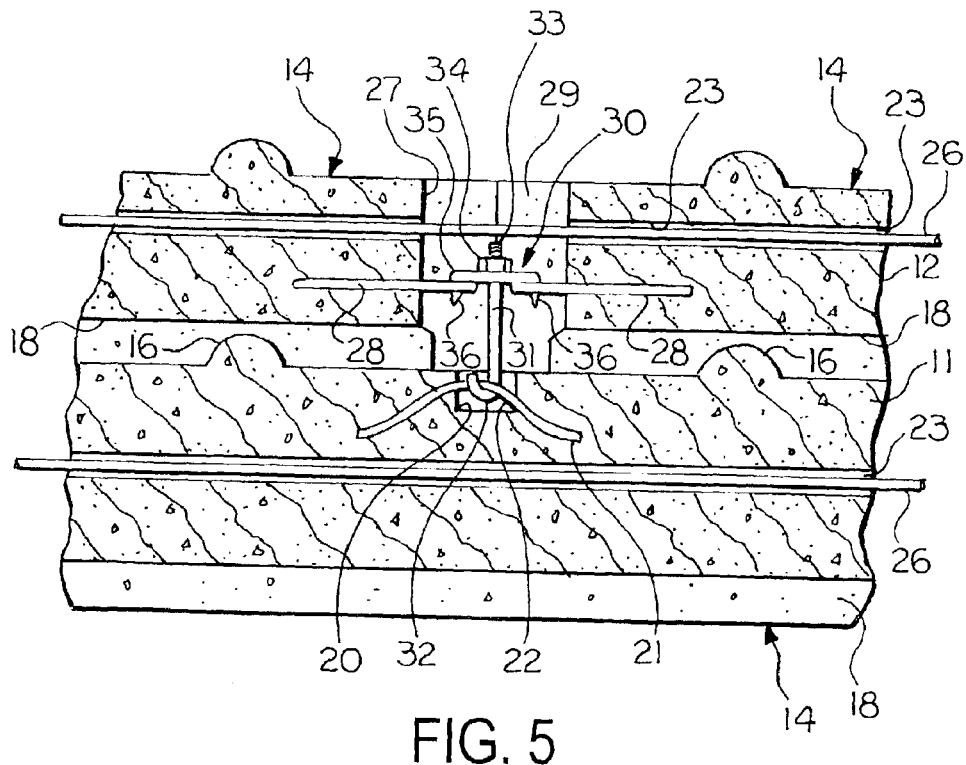
FIG. 5 is an enlarged fragmentary cross sectional view as taken along line 5—5 of FIG. 4.
Figure 6:
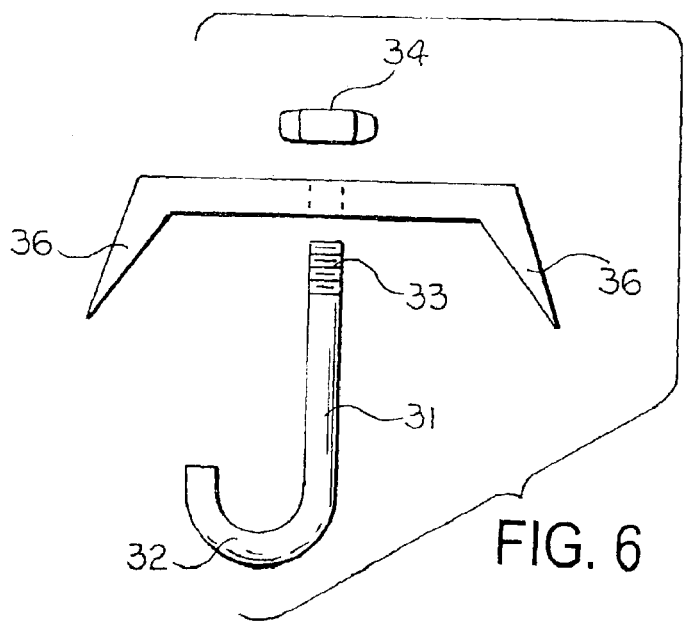
FIG. 6 is an exploded view of the locking device of FIG. 5.

Fragmentary portions of blocks 14 of two tiers 11 and 12 are illustrated in FIGS. 4 and 5. When the ends 24 and 25 of two blocks 14 in the tier 12 abut, the vertical grooves 27 come together to form a generally cylindrical vertical opening 29. The blocks 14 in the illustrated two tiers 11 and 12 are staggered so that each opening 29 between blocks 14 in the tier 12 is positioned above an anchor 22 in the top of one of the blocks 14 in the tier 11.

A locking device 30 is connected between two adjacent blocks 14 to secure the two blocks 14 together and to an anchor 22 which is embedded in a lower block 14 or in a surface on which the two adjacent blocks 14 rest. For example, the anchor 22 also can be embedded in a poured concrete footer for the wall, or secured to pavement where a wall is to be constructed, or it may be a known type of ground anchor. The locking device 30 consists of a J-shaped member 31 in the form of a rod having a hooked lower end 32 and a shaft terminating at a threaded upper end 33 for receiving a nut 34, and a bracket 35. The bracket 35 has a center opening sized for passing the member 31 and having hooked or otherwise shaped ends 36 for engaging the hooks 28 at adjacent block ends 24 and 25. In order to secure the blocks 14 together, the locking device 30 is inserted into the cylindrical opening 29, and the hooked lower end 32 is hooked under the anchor 22 in the adjacent lower block 14. The bracket 35 is then positioned so that the hooked ends 36 engage the hooks 28 projecting from the ends 24, 25 of each block 14 and the nut 34 is tightened. It will be appreciated that any suitable locking device may be used and that a suitable locking device need not necessarily be as the described locking device 30.

Preferably, the cable 26 for each tier of blocks 14 is passed through the tubes 23 after the blocks 14 in the tier are secured together and to the blocks 14 in the adjacent lower tier or to ground anchors with the locking devices 30.

Optionally, if the wall 10 is to be a permanent installation, the cylindrical openings 29 between adjacent blocks 14 in each tier may be filled with concrete prior to stacking the next tier of blocks 14 which will form the wall 10. The concrete filling the openings 29 forms keys (not shown) which further lock together ends of adjacent blocks 14.

Figure 7:
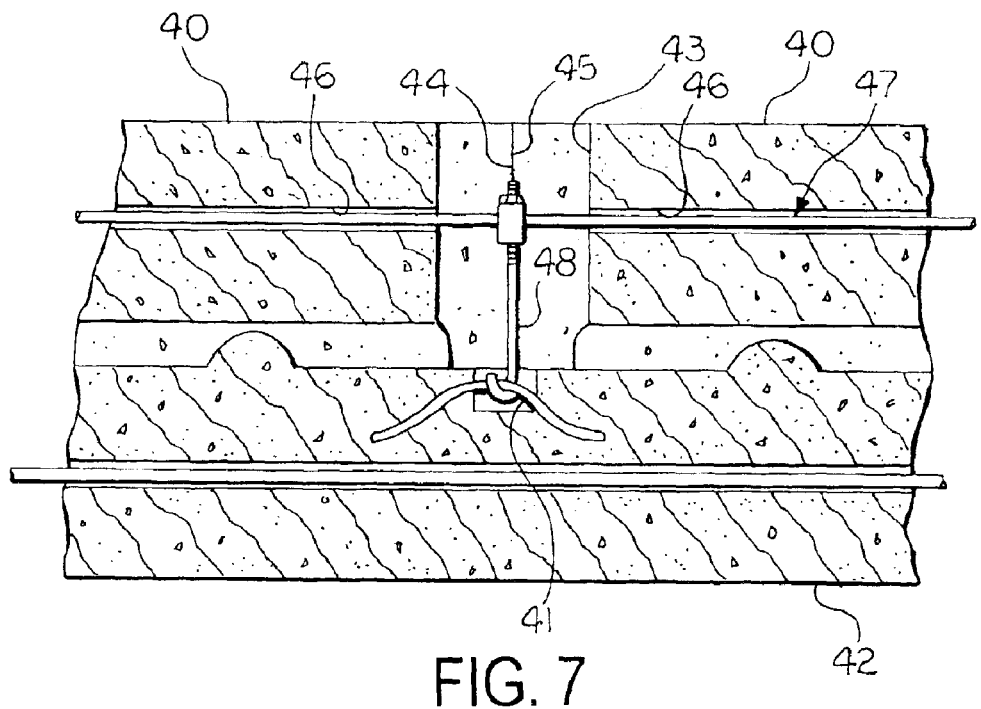
FIG. 7 is an enlarged fragmentary cross sectional view of a modified construction for securing two wall blocks.
Figure 8:
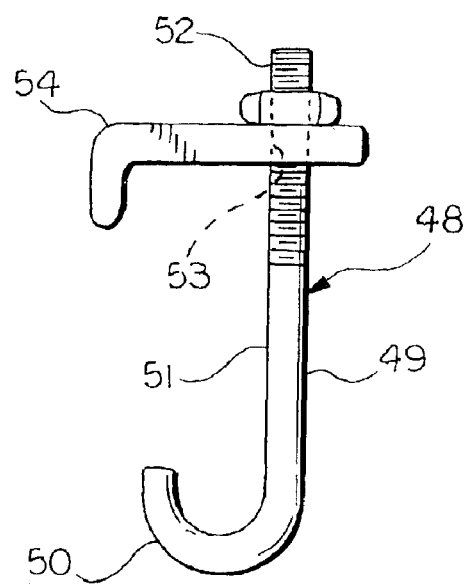
FIG. 8 is a side view of the modified locking device shown in FIG. 7.

FIGS. 7 and 8 show details of a modified arrangement for securing two blocks 40 together in an end-to-end arrangement and to an anchor 41 embedded in an adjacent lower block 42. A vertical opening 43 is formed between abutting ends 44 and 45 of the two blocks 40. The two blocks 40 are located so that the vertical opening 43 is positioned above the anchor 41. Each of the blocks 40 includes a passage 46 which extends from the vertical opening through the block 40. A cable 47 is threaded through the passages 46 and is tensioned to secure the blocks 40 together. A locking device 48 is connected between the cable 47 and the anchor 41 to securely connect the two blocks 40 to the lower block 42 or other surface on which the blocks 40 are supported. The locking device 48 includes a generally J-shaped member 49 having a hooked lower end 50 and a shaft 51 terminating at a threaded upper end 52. The shaft 51 passes through an opening 53 in a bracket 54. the bracket 54 is hooked or otherwise shaped to engage the cable 47. In use, the hooked lower end 50 of the member 49 is positioned to engage the anchor 41, the bracket 54 is positioned on the shaft 51 to engage the cable 47, and a nut is threaded onto the shaft end 52 to securely connect between the cable 47 and the anchor 41.

It will be appreciated that other variations to the system for interconnecting blocks forming walls will be apparent to those skilled in the art without departing from the spirit and the scope of the invention. Although the system is particularly useful for use in constructing freestanding force containment walls, it also may be used for other applications such as retaining walls. In the described preferred embodiment of the invention, knobs 16 are formed on the tops and grooves 18 are formed in the bottoms of the blocks 14 to facilitate alignment of the blocks 14 when they are stacked and also to impart strength to the wall 10. It will be appreciated that the invention also may be used with blocks which do not have the top knobs 16 and the bottom groves 18, and with concrete blocks having other structure for interlocking the blocks without departing from the scope of the invention.

What is claimed is:

1. A wall including an anchor secure against vertical movement relative to a surface, two blocks supported on said surface and each having an end abutting the end of the other of said blocks, said two blocks defining a vertical opening between said abutting ends positioned above said anchor, means extending into said vertical opening securing said two blocks together, and means in said vertical opening securing said two blocks to said anchor whereby said blocks are secured against vertical movement relative to said surface.

2. A wall, as set forth in claim 1, and wherein each of said two blocks includes a hook extending into said vertical opening, and wherein said means in said vertical opening securing said two blocks to said anchor includes a locking member securing said hooks to said anchor.

3. A wall, as set forth in claim 2, and wherein said locking member includes a first member having a first end engaging said anchor and having a shaft with a threaded second end, a bracket having ends engaging said hooks in said vertical opening, said second shaft end extending through an opening in said bracket, and a nut engaging said threaded second end whereby said locking member connects said hooks and said anchor.

4. A wall including an anchor, two blocks each having an end abutting the end of the other of said blocks, said two blocks defining a vertical opening between said abutting ends positioned above said anchor, means extending into said vertical opening securing said two blocks together, means in said vertical opening securing said two blocks to said anchor, wherein each of said blocks has two spaced ends and a passage extending through the block between said spaced ends, wherein the passages in said blocks have ends which connect to said vertical opening at said abutting ends, and wherein said means securing said two blocks together includes a tensioned cable extending through said passages and through said vertical opening.

5. A wall, as set forth in claim 4, and wherein said means in said vertical opening securing said two blocks to said anchor connects between said cable and said anchor.

6. A wall, as set forth in claim 5, and wherein said anchor is a curved rod embedded in a third block, and wherein said two blocks are positioned on said third block.

7. A wall, as set forth in claim 4, and wherein each of said two blocks includes a hook extending into said vertical opening, and wherein said means in said vertical opening securing said two upper blocks to said anchor includes a locking member securing said hooks to said anchor.

8. A wall, as set forth in claim 7, and wherein said locking member includes a first member having a first end engaging said anchor and having a shaft with a threaded second end, a bracket having ends engaging said hooks in said vertical opening, said second shaft end extending through an opening in said bracket, and a nut engaging said threaded second end whereby said locking member connects said hooks and said anchor.

9. A method for securing two wall blocks, comprising the steps of:
 a) forming an anchor secure against vertical movement relative to a surface;
 b) forming first and second wall blocks, each wall block having an end defining a vertical groove;
 c) positioning said first and second blocks together end-to-end above said surface with said grooves abutting to form a vertical opening between said blocks and with said vertical opening positioned above said anchor; and
 d) inserting a member in said opening to secure said first and second blocks to said anchor whereby said blocks are secured by said member against vertical movement relative to said surface.

10. A method for securing two wall blocks, as set forth in claim 9, and wherein said anchor is formed in an upper surface of a third wall block.

11. A method for securing two wall blocks, as set forth in claim 10, and further including the step of embedding a hook in each of said first and second blocks with said hook extending into the vertical groove for said block, and wherein said member inserted into said opening engages said hooks and said anchor.

12. A method for securing two wall blocks, as set forth in claim 9, and further including the steps of forming a first passage from said vertical groove in said first block through said first block; forming a second passage from said vertical groove in said second block through said second block; passing a cable through said first passage, said opening and second passages; and tensioning said cable.

13. A method for securing two wall blocks, as set forth in claim 12, and wherein said member connects said cable to said anchor.

14. A method for securing two wall blocks, as set forth in claim 13, and wherein said anchor is formed in an upper surface of a third wall block.

15. A method for securing two wall blocks, comprising the steps of:
 a) forming an anchor in an upper surface of a third wall block;
 b) forming first and second wall blocks, each wall block having an end defining a vertical groove and a hook embedded into the block extending into the vertical groove;
 c) positioning said first and second blocks together end-to-end above said surface with said grooves abutting to form a vertical opening between said blocks and with said vertical opening positioned above said anchor;
 d) inserting a member in said opening to secure hooks on said first and second blocks to said anchor;
 e) forming a first passage from said vertical groove in said first block through said first block;
 f) forming a second passage from said vertical groove in said second block through said second block; and
 g) passing a cable through said first passage, said opening and second passages; and tensioning said cable.

* * * * *